United States Patent
Yutani

(10) Patent No.: US 11,300,851 B2
(45) Date of Patent: Apr. 12, 2022

(54) PLUGGABLE OPTICAL MODULE, OPTICAL COMMUNICATION SYSTEM AND CONTROL METHOD OF PLUGGABLE OPTICAL MODULE

(71) Applicant: NEC Corporation, Tokyo (JP)

(72) Inventor: Katsuhiro Yutani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/409,227

(22) Filed: May 10, 2019

(65) Prior Publication Data

US 2019/0265572 A1    Aug. 29, 2019

Related U.S. Application Data

(63) Continuation-in-part of application No. 15/559,616, filed as application No. PCT/JP2016/001603 on Mar. 18, 2016, now Pat. No. 10,331,006.

(30) Foreign Application Priority Data

Mar. 20, 2015 (JP) .................................. 2015-057345

(51) Int. Cl.
*G02F 1/225*     (2006.01)
*H04B 10/50*    (2013.01)
(Continued)

(52) U.S. Cl.
CPC ..... *G02F 1/2252* (2013.01); *H04B 10/25891* (2020.05); *H04B 10/50* (2013.01);
(Continued)

(58) Field of Classification Search
CPC ............. G02F 1/2252; G02F 2001/212; H04B 10/2504; H04B 10/516
(Continued)

(56) References Cited

U.S. PATENT DOCUMENTS

| 4,954,960 A * | 9/1990 | Lo ......................... B06B 1/0253 |
| | | 318/729 |
| 6,539,131 B1 * | 3/2003 | Gill ....................... G02F 1/3136 |
| | | 385/3 |

(Continued)

FOREIGN PATENT DOCUMENTS

| CN | 101621869 A | 1/2010 |
| CN | 101634759 A | 1/2010 |

(Continued)

OTHER PUBLICATIONS

International Search Report dated May 24, 2016, in corresponding PCT International Application.

(Continued)

*Primary Examiner* — Jerry M Blevins

(57) ABSTRACT

To autonomously apply a bias voltage to an optical modulator according to phase angle information provided from outside in a pluggable optical module. A pluggable electric connector (11) can communicate a communication data signal and a control signal with an optical communication apparatus (92). An optical signal output unit (13) includes a Mach-Zehnder type optical modulator including a phase modulation area and outputs an optical modulation signal (LS) modulated according to the communication data signal. An optical power control unit (14) can control optical power of the optical modulation signal (LS). A pluggable optical receptor (15) can output the optical modulation signal (LS) to an optical fiber (91). A control unit (12) controls a modulation operation of the optical signal output unit (13) and the bias voltage applied to the phase modulation area. The control unit (12) determines the bias voltage applied to the phase modulation area according to phase angle information of the control signal (CON1). The optical signal (Continued)

output unit (13) applies the bias voltage determined by the control unit (12) to the phase modulation area.

24 Claims, 14 Drawing Sheets

(51) Int. Cl.
  *H04B 10/564* (2013.01)
  *H04B 10/588* (2013.01)
  *H04B 10/25* (2013.01)
  *H04B 10/516* (2013.01)
  *G02F 1/21* (2006.01)

(52) U.S. Cl.
  CPC ......... *H04B 10/516* (2013.01); *H04B 10/564* (2013.01); *H04B 10/588* (2013.01); *G02F 1/212* (2021.01)

(58) Field of Classification Search
  USPC ............................................................ 385/3
  See application file for complete search history.

(56) References Cited

U.S. PATENT DOCUMENTS

| | | | | |
|---|---|---|---|---|
| 2002/0001115 | A1* | 1/2002 | Ishida | .............. H04B 10/50575 |
| | | | | 398/182 |
| 2011/0064351 | A1* | 3/2011 | Kise | ..................... G02F 1/0121 |
| | | | | 385/3 |
| 2011/0280582 | A1* | 11/2011 | Piehler | ............. H04B 10/25751 |
| | | | | 398/117 |
| 2012/0301152 | A1 | 11/2012 | Edwards et al. | |
| 2013/0016418 | A1* | 1/2013 | Chen | ..................... G02F 1/0123 |
| | | | | 359/279 |
| 2013/0135704 | A1* | 5/2013 | Fujisaku | ................... G02F 2/00 |
| | | | | 359/279 |
| 2016/0218799 | A1* | 7/2016 | Ishikawa | ............ H04B 10/0793 |

FOREIGN PATENT DOCUMENTS

| | | |
|---|---|---|
| CN | 102625199 B | 6/2014 |
| CN | 203691410 U | 7/2014 |
| JP | 2005-326548 | 11/2005 |
| JP | 2013-142815 | 7/2013 |
| JP | 2013-225762 | 10/2013 |
| JP | 2014-10187 | 1/2014 |
| JP | 2014-10189 | 1/2014 |
| JP | 2014-160985 | 9/2014 |

OTHER PUBLICATIONS

Chinese Office Action dated Apr. 3, 2019, by the Chinese Patent Office in counterpart Chinese Patent Application 201680016974.6.
Office Action dated Dec. 5, 2019, issued by The Chinese Patent Office in counterpart Chinese Patent Application No. 201680016974.6.

* cited by examiner

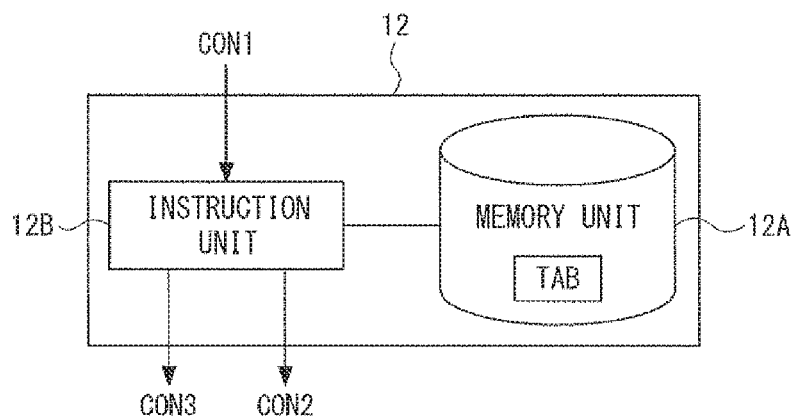
Fig. 3
| INSTRUCTED PHASE ANGLE | BIAS VOLTAGE |
|---|---|
| 0° (001) | V1 |
| 180° (010) | V2 |
| 90° (011) | V3 |
| 45° (100) | V4 |
Fig. 4
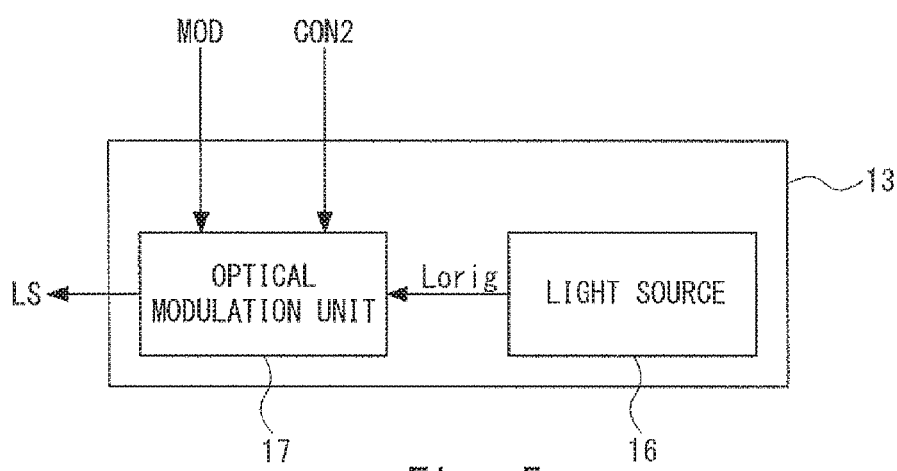
Fig. 5

PLUGGABLE OPTICAL MODULE, OPTICAL COMMUNICATION SYSTEM AND CONTROL METHOD OF PLUGGABLE OPTICAL MODULE

CROSS-REFERENCE TO RELATED PATENT APPLICATIONS

This application is a continuation of U.S. patent application Ser. No. 15/559,616, filed Sep. 19, 2017, which is a National Stage Entry of International Application No. PCT/JP2016/001603, filed Mar. 18, 2016, which claims priority from Japanese Patent Application No. 2015-057345, filed Mar. 20, 2015. The entire contents of the above-referenced applications are expressly incorporated herein by reference.

TECHNICAL FIELD

The present invention relates to a pluggable optical module, an optical communication system and a control method of pluggable optical module.

BACKGROUND ART

In an optical communication system, an optical module used for transmission/reception of an optical signal is embedded. In such optical module, a Mach-Zehnder type optical modulator is used (e.g. Patent Literature 1). As the Mach-Zehnder type optical modulator, one in which phase difference between two optical waveguides constituting a Mach-Zehnder interferometer changes nonlinearly with respect to an applied voltage is known. In such Mach-Zehnder type optical modulator, a bias electrode to which a bias voltage is applied and a modulation electrode to which a data signal is applied are formed on one or both of the two optical waveguides.

Another example where the bias voltage is applied to the optical waveguide is also known (e.g. Patent Literature 2). In this example, an input light is split to two optical waveguides and the split lights propagating through each optical waveguide are multiplexed to output a modulated light. The bias voltage supplied to at least one optical waveguide in the two optical waveguides is controlled according to a wavelength of the input light. Further, a phase of the modulated light is controlled by a phase device voltage according to the wavelength of the input light.

A multivalued optical signal transmitter configured by using a Mach-Zehnder modulator (Patent Literature 3) is also introduced.

Meanwhile, for example, in an optical communication system in conformity with standards such as SFP (Small Form-Factor Pluggable) and XFP, use of a pluggable optical module has been developed. The pluggable optical module is an optical transceiver that is insertable into and removal from a socket of an optical communication apparatus. When performing a control of the pluggable optical module, the pluggable optical module receives control information from the optical communication apparatus serving as a host side. Then, operation switching and changing of the pluggable optical module are performed according to the received control information.

CITATION LIST

Patent Literature

[Patent Literature 1] Japanese Unexamined Patent Application Publication No. 2014-10187
[Patent Literature 2] Japanese Unexamined Patent Application Publication No. 2014-160985
[Patent Literature 3] Japanese Unexamined Patent Application Publication No. 2005-326548

SUMMARY OF INVENTION

Technical Problem

However, the inventor has found out that there is a problem in the methods described above as descried below. When the Mach-Zehnder optical module is used, a bias point of the optical modulator can be controlled by applying the bias voltage to the electrode provided on the optical waveguide of the optical modulator. However, since there are individual differences among the optical modulators embedded in the pluggable optical module, the bias voltages to be applied to shift by the same phase are different for each pluggable optical module. Therefore, the pluggable optical module that can autonomously perform a change operation of the bias point when receiving a request for changing the bias point from the optical communication apparatus is required.

The present invention has been made in view of the aforementioned circumstances and aims to autonomously apply an appropriate bias voltage to an optical modulator according to phase angle information provided from outside in a pluggable optical module.

Solution to Problem

An aspect of the present invention is an optical module including: a pluggable electric connector configured to be capable of communicating a communication data signal and a control signal with an optical communication apparatus, the pluggable electric connector being insertable into and removable from the optical communication apparatus; an optical signal output unit including a Mach-Zehnder type optical modulator in which a phase modulation area are provided on a waveguide and configured to output an optical signal modulated according to the communication data signal; an optical power control unit configured to be capable of controlling optical power of the optical signal; a pluggable optical receptor configured to be capable of outputting the optical signal output from the optical power control unit to an optical fiber, the optical fiber being insertable into and removable from the pluggable optical receptor; and a control unit configured to control a modulation operation of the optical signal output unit and the bias voltage applied to the phase modulation area, in which the control unit determines the bias voltage applied to the phase modulation area according to the phase angle information included in the control signal from the pluggable electric connector, and the optical signal output unit applies the bias voltage determined by the control unit to the phase modulation area.

An aspect of the present invention is an optical communication system including: an optical fiber configured to transmit an optical signal; a pluggable optical module configured to output the optical signal to the optical fiber, the optical fiber being insertable into and removable from the pluggable optical module; and an optical communication apparatus configured to control the pluggable optical module, the pluggable optical module being insertable into and removable from the optical communication apparatus, in which the pluggable optical module includes: a pluggable electric connector configured to be capable of communicating a communication data signal and a control signal with an optical communication apparatus, the pluggable electric connector being insertable into and removable from the optical communication apparatus; an optical signal output unit including a Mach-Zehnder type optical modulator in which a phase modulation area are provided on a waveguide and configured to output an optical signal modulated according to the communication data signal; an optical power control unit configured to be capable of controlling optical power of the optical signal; a pluggable optical receptor configured to be capable of outputting the optical signal output from the optical power control unit to the optical fiber, the optical fiber being insertable into and removable from the pluggable optical receptor; and a control unit configured to control a modulation operation of the optical signal output unit and the bias voltage applied to the phase modulation area, the control unit determines the bias voltage applied to the phase modulation area according to the phase angle information included in the control signal from the pluggable electric connector, and the optical signal output unit applies the bias voltage determined by the control unit to the phase modulation area.

An aspect of the present invention is a wavelength change method of a pluggable optical module including: receiving a communication data signal and a control signal from a pluggable electric connector, the pluggable electric connector being insertable into or removable from an optical communication apparatus; determining a bias voltage applied to a phase modulation area provided in a Mach-Zehnder type optical modulator based on phase angle information included in the control signal; modulating a light from a light source based on the determined bias voltage and the communication data signal to generate the optical signal; controlling optical power of the optical signal; and outputting the optical signal the optical power of which is controlled to the optical fiber via a pluggable optical receptor, the optical fiber being insertable into and removable from the pluggable optical receptor.

Advantageous Effects of Invention

According to the present invention, it is possible to autonomously apply an appropriate bias voltage to an optical modulator according to phase angle information provided from outside in a pluggable optical module.

BRIEF DESCRIPTION OF DRAWINGS

FIG. 3 is a block diagram illustrating a configuration of a control unit according to the first exemplary embodiment;

FIG. 4 is a diagram illustrating contents of a table of the control unit according to the first exemplary embodiment;

FIG. 5 is a block diagram illustrating a configuration example of an optical signal output unit according to the first exemplary embodiment;

DESCRIPTION OF EMBODIMENTS

Figure 1:
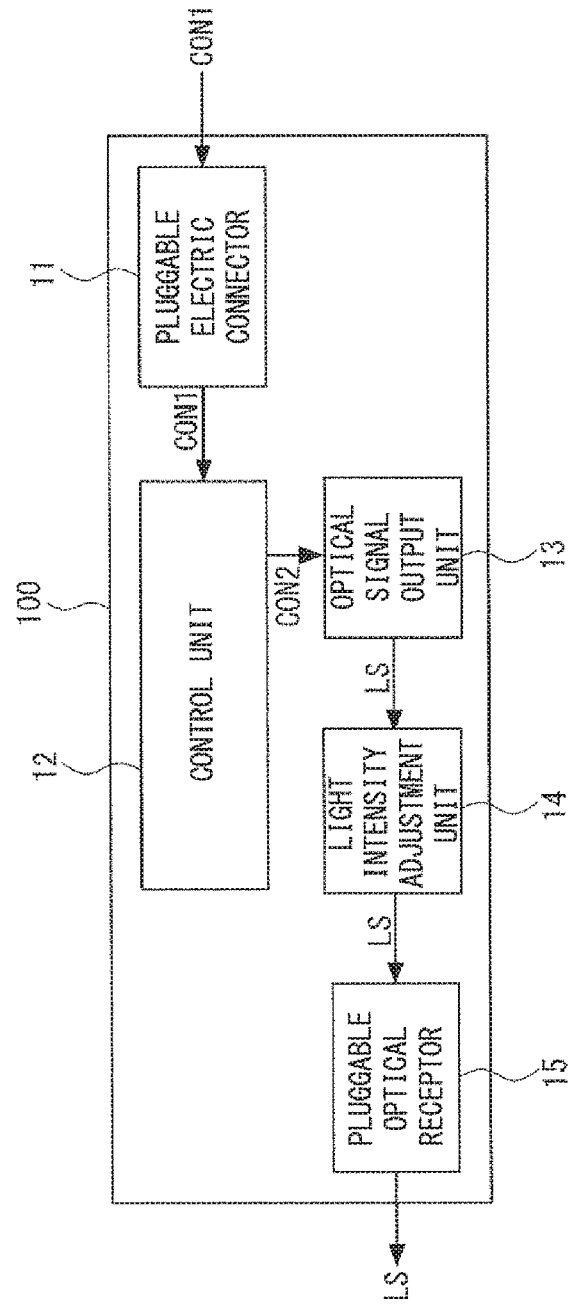
FIG. 1 is a block diagram schematically illustrating a configuration of a pluggable optical module according to a first exemplary embodiment.

Exemplary embodiments of the present invention will be described below with reference to the drawings. The same components are denoted by the same reference numerals throughout the drawings, and a repeated explanation is omitted as needed.

First Exemplary Embodiment

Figure 2:
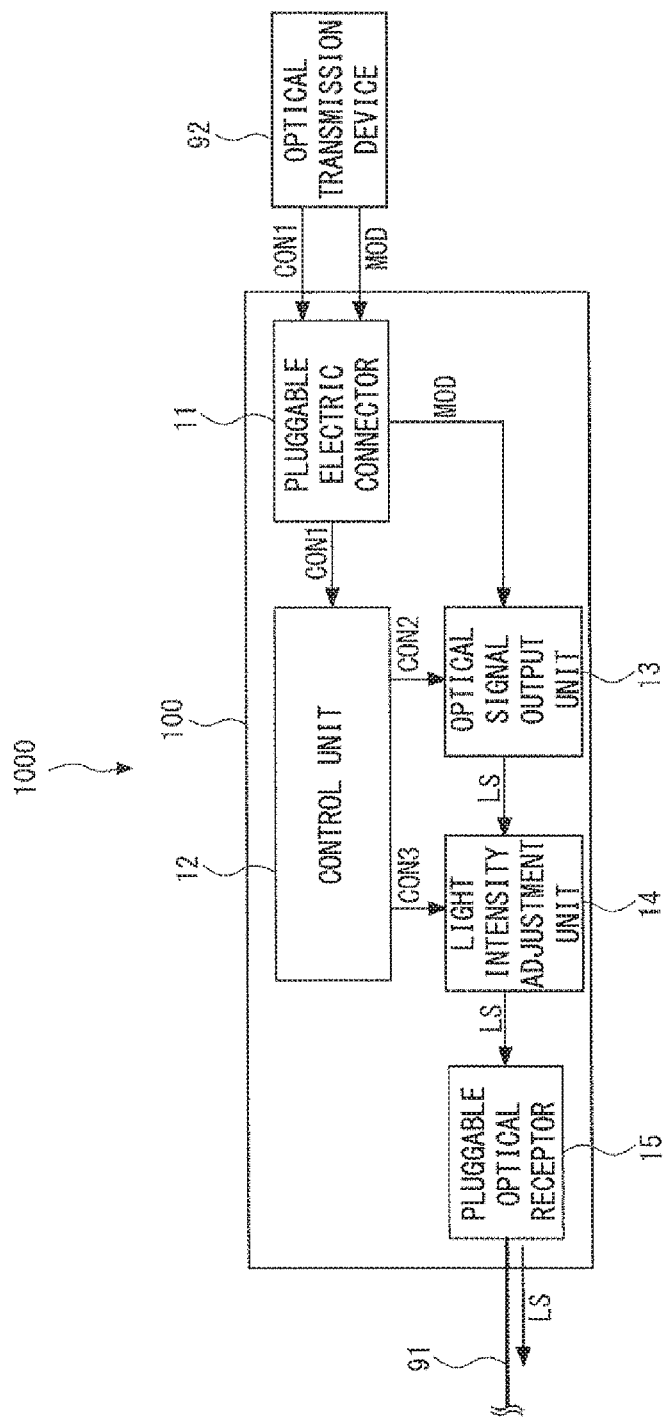
FIG. 2 is a block diagram illustrating a configuration example of a main part of an optical communication system in which the pluggable optical module according to the first exemplary embodiment is embedded.

A pluggable optical module 100 according to a first exemplary embodiment will be described. FIG. 1 is a block diagram schematically illustrating a configuration of the pluggable optical module 100 according to the first exemplary embodiment. FIG. 2 is a block diagram illustrating a configuration example of a main part of an optical communication system 1000 in which the pluggable optical module 100 according to the first exemplary embodiment is embedded. As illustrated in FIG. 2, the pluggable optical module 100 is configured to cause an optical fiber with connector 91 to be insertable into and removal from the pluggable optical module 100. For example, a LC connector and MU connector, etc. can be used as a connector of the optical fiber with connector 91. The pluggable optical module 100 is controlled based on a control signal CON1 input from the optical communication apparatus 92 that is a communication host. Note that the pluggable optical module 100 can also receive a modulation signal MOD that is a data signal with the control signal CON1 from the optical communication apparatus 92. In this case, the pluggable optical module 100 may output an optical modulation signal LS modulated based on the received modulation signal MOD. The optical communication apparatus 92 performs communication signal processing such as flaming processing of a communication data signal from the pluggable optical module 100 or a communication signal input to the pluggable optical module 100, for example.

The pluggable optical module 100 includes a pluggable electric connector 11, an optical signal output unit 13, an optical power control unit 14, a control unit 12, and a pluggable optical receptor 15.

The pluggable electric connector 11 is configured to be insertable into and removable from the optical communication apparatus 92. The pluggable electric connector 11 receives the control signal CON1 that is an electric signal output from the optical communication apparatus 92 and forwards the control signal CON1 to the control unit 12. The pluggable electric connector 11 may also receive the modulation signal MOD that is an electric signal output from the optical communication apparatus 92 and forwards it to the optical signal output unit 13. The pluggable electric connector 11 may also forward an electric signal output from the control unit 12 to the optical communication apparatus 92.

The control unit 12 controls an operation of the optical signal output unit 13 based on the control signal CON1 input from the optical communication apparatus 92 via the pluggable electric connector 11. The control signal CON1 includes phase angle information representing a phase angle to be set to arms (waveguides) of a Mach-Zehnder optical modulator. FIG. 3 is a block diagram illustrating a configuration of the control unit 12 according to the first exemplary embodiment. The control unit 12 includes a memory unit 12A and a command unit 12B. In the memory unit 12A, a table TAB representing correspondence between the phase angle information and a bias voltage applied to the arms (waveguides) of the Mach-Zehnder optical modulator is stored. The command unit 12B refers to the table TAB based on the received phase angle information and determines the corresponding bias voltage. Then, the command unit 12B instructs a value of the determined bias voltage to the optical signal output unit 13 by the control signal CON2.

FIG. 4 is a diagram illustrating contents of the table TAB in the control unit 12 according to the first exemplary embodiment. In the table TAB, information representing correspondence between the phase angle instructed by the optical communication apparatus 92 and the bias voltage is stored. In FIG. 4, the phase angle information is provided by an 8-bit signal. The optical communication apparatus 92 outputs the control signal CON1 represented by the 8-bit value to the control unit 12 according to the instructed phase angle. Here, values of the phase angle information and the control signal CON1 may be various types such as a 16-bit signal with code, for example.

The control unit 12 can also control optical power of the optical modulation signal LS output from the optical power control unit 14 by the control signal CON3 output to the optical power control unit 14.

The optical signal output unit 13 includes the Mach-Zehnder type optical modulator and outputs the optical modulation signal LS modulated by a predetermined modulation method. The optical signal output unit 13 modulates the optical modulation signal LS by applying the modulation signal MOD to phase modulation areas formed on the waveguides of the Mach-Zehnder type optical modulator. The optical signal output unit 13 can also control a bias point of the Mach-Zehnder type optical modulator by applying the bias voltages to the phase modulation areas. Note that the optical signal output unit 13 can modulate the optical modulation signal LS by various modulation methods such as phase modulation, amplitude modulation and polarization modulation, or by combining the various modulation methods. Here, for example, the Mach-Zehnder type optical modulator is a semiconductor optical modulator, etc.

Here, the phase modulation area is an area that includes an electrode formed on the optical waveguide. An effective refractive index of the optical waveguide below the electrode is changed by applying an electric signal. e.g., a voltage signal, to the electrode. As a result, a substantial optical length of the optical waveguide in the phase modulation area can be changed. Thus, the phase modulation area can change the phase of the optical signal propagating through the optical waveguide. Then, the optical signal can be modulated by providing a phase difference between the optical signals propagating through two optical waveguides.

A configuration example of the optical signal output unit 13 will be described. FIG. 5 is a block diagram illustrating the configuration example of the optical signal output unit 13 according to the first exemplary embodiment. The optical signal output unit 13 includes a light source 16 and an optical modulation unit 17. The light source 16 is a wavelength-tunable optical module, etc. including a semiconductor laser device and a ring oscillator, for example, and outputs an output light Lorig. The output light Lorig is controlled by a control signal CON2.

The optical modulation unit 17 is a Mach-Zehnder type optical modulator, for example. Note that, although not illustrated in FIG. 1, the optical modulation unit 17 outputs the optical modulation signal LS generated by modulating the output light Lorig according to the modulation signal MOD corresponding to the communication data signal input from the optical communication apparatus 92 via the pluggable electric connector 11.

Figure 6:
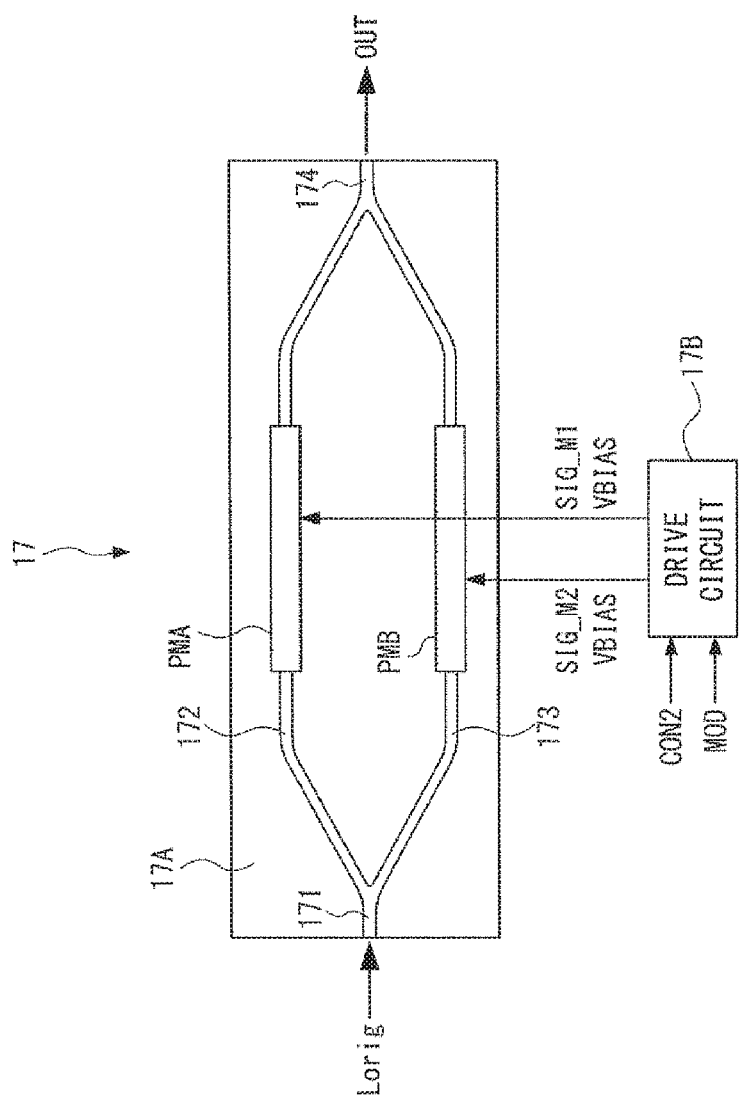
FIG. 6 is a diagram schematically illustrating a configuration of an optical modulation unit according to the first exemplary embodiment.

Next, a configuration of the optical modulation unit 17 will be described. FIG. 6 is a diagram schematically illustrating the configuration of the optical modulation unit 17 according to the first exemplary embodiment. The optical modulation unit 17 is configured as a general Mach-Zehnder type optical modulator. The optical modulation unit 17 includes an optical modulator 17A and a driver circuit 17B.

The optical modulator 17A modulates the output light Lorig from the light source 16 to output the optical modulation signal LS. The optical modulator 17A includes waveguides 171 to 174 and phase modulation areas PMA and PMB. The output light Lorig from the light source 16 is input to one end of the waveguide 171. The other end of the waveguide 171 is optically connected to one end of the waveguide 172 and one end of the waveguide 173. Thus, a light propagating through the waveguide 171 is split into the waveguide 172 and the waveguide 173. The other end of the waveguide 172 and the other end of the waveguide 173 are connected to one end of the waveguide 174. The phase modulation area PMA that changes a phase of a light propagating trough the waveguide 172 is provided on the waveguide 172. The phase modulation area PMB that changes a phase of a light propagating trough the waveguide 172 is provided on the waveguide 173. The optical modulation signal LS is output from the other end of the waveguide 174.

The driver circuit 17B can control a bias point of the optical modulator 17A by applying a bias voltage VBIAS to one or both of the phase modulation areas PMA and PMB according to the control signal CON2 while controlling a modulation operation of the optical modulator 17A. Hereinafter, a case where the driver circuit 17B applies the bias voltage to the phase modulation area PMA will be described. Further, the driver circuit 17B can modulate the optical modulation signal LS by applying the modulation signal MOD to one or both of the phase modulation areas PMA and PMB. In this example, the driver circuit 17B applies a modulation signal SIG_M1 to the phase modulation area PMA according to the modulation signal MOD. The driver circuit 17B applies a modulation signal SIG_M2 to the phase modulation area PMB according to the modulation signal MOD.

The optical power control unit 14 can control the optical power of the optical modulation signal LS by attenuating or blocking the optical modulation signal LS output from the optical signal output unit 13. As described above, the optical power control unit 14 controls the optical power of the optical modulation signal LS according to a control signal CON3 output from the control unit 12. For example, an optical attenuator may be used as the optical power control unit 14.

The pluggable optical receptor 15 (also referred to as a first pluggable optical receptor) is configured to cause a connector of the outside optical fiber with connector 91 (also referred to as a first optical transmission line) to be insertable into and removable from the pluggable optical receptor 15. The pluggable optical receptor 15 transmits the optical modulation signal LS output from the optical power control unit 14 to the optical fiber 91.

Figure 7:
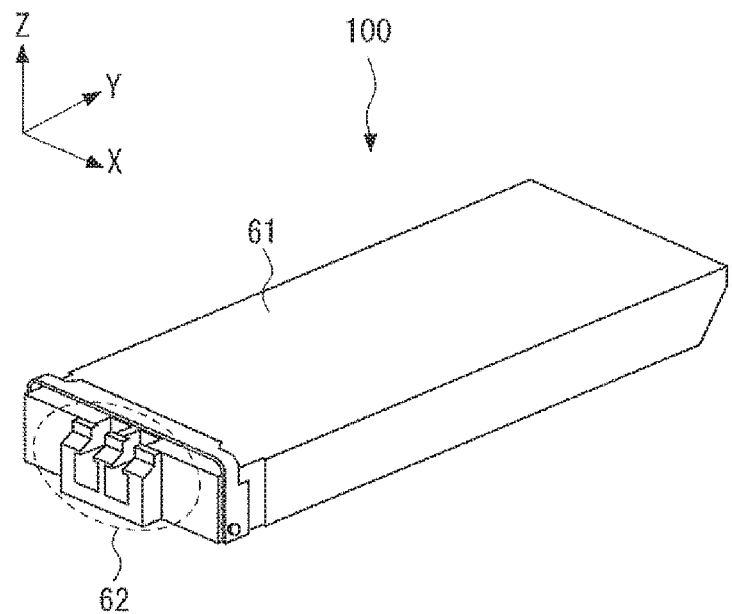
FIG. 7 is a perspective view when the pluggable optical module according to the first exemplary embodiment is observed from a side of an optical fiber.
Figure 8:
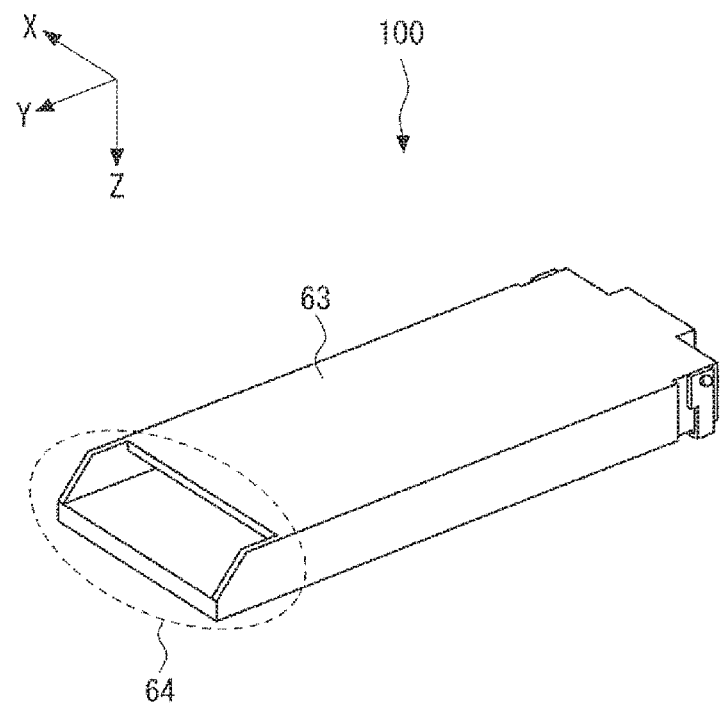
FIG. 8 is a perspective view when the pluggable optical module according to the first exemplary embodiment is observed from a side of an optical communication apparatus.

Appearances of the pluggable optical module 100 will be described. FIG. 7 is a perspective view when the pluggable optical module 100 according to the first exemplary embodiment is observed from a side of the optical fiber 91. A numerical sign 61 shown in FIG. 7 indicates an upper surface of the pluggable optical module 100. A numerical sign 62 shown in FIG. 7 indicates an entry point of the pluggable optical receptor 15 into which the connector of the optical fiber 91 is inserted. FIG. 8 is a perspective view when the pluggable optical module 100 according to the first exemplary embodiment is observed from a side of the optical communication apparatus 92. A numerical sign 63 shown in FIG. 8 indicates a lower surface of the pluggable optical module 100. A numerical sign 64 shown in FIG. 8 indicates a connection part of the pluggable electric connector 11 which is connected to the optical communication apparatus 92.

Figure 9:
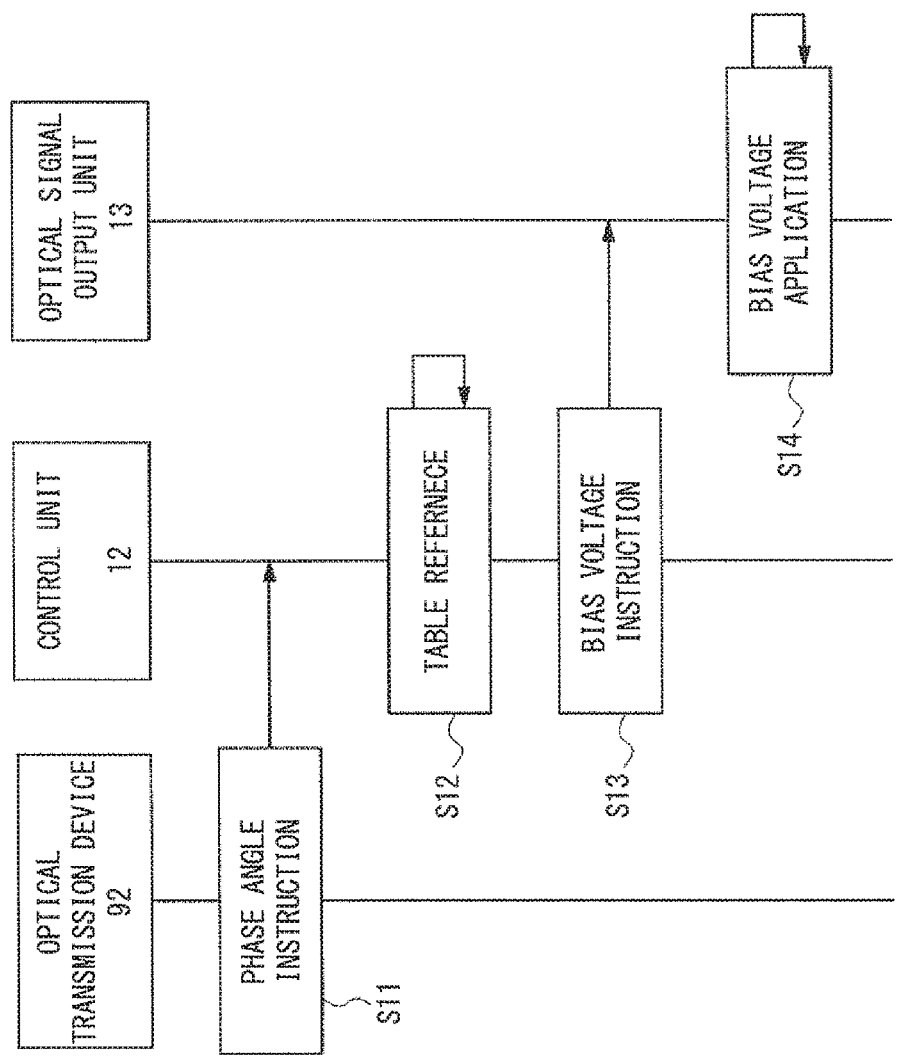
FIG. 9 is a sequence diagram illustrating a bias point change operation of the pluggable optical module according to the first exemplary embodiment.

Next, a bias point change operation of the pluggable optical module 100 will be described. FIG. 9 is a sequence diagram illustrating the bias point change operation of the pluggable optical module 100 according to the first exemplary embodiment.

Step S11: Phase Angle Information Reception

The control unit 12 receives the control signal CON1 including the phase angle information for the bias point change from the optical communication apparatus 92.

Step S12: Table Reference

The control unit 12 refers to the table TAB based on the received phase angle information to determine the bias voltage applied to the phase modulation area PMA.

Step S13: Bias Voltage Command

The control unit 12 instructs the value of the determined bias voltage to the optical signal output unit 13 by the control signal CON2.

Step S14: Bias Voltage Application

The optical signal output unit 13 applies the bias voltage to the phase modulation area PMA.

As described above, according to the present configuration, when the bias point of the optical modulation unit 17 of the optical signal output unit 13 in the pluggable optical module 100 is changed, the external optical communication apparatus 92 may provide with the phase angle information. As the phase angle information, a general signal such as a digital signal can be used. In this exemplary embodiment, the value of the bias voltage stored in the table TAB is predetermined to control the bias point of the optical modulation unit 17 according to the instructed phase angle information. Thus, the control unit 12 refers to the table TAB to instruct the bias voltage and thereby can control the bias point of the optical modulation unit 17 according to the instructed phase angle information.

Therefore, according to the present configuration, the optical communication apparatus can control the bias point of the optical modulator without considering individual difference of the pluggable optical module. Further, the pluggable optical module can autonomously apply the appropriate bias voltage to the phase modulation area of the optical modulator by referring to the table according to the command from the optical communication apparatus.

Second Exemplary Embodiment

Figure 10:
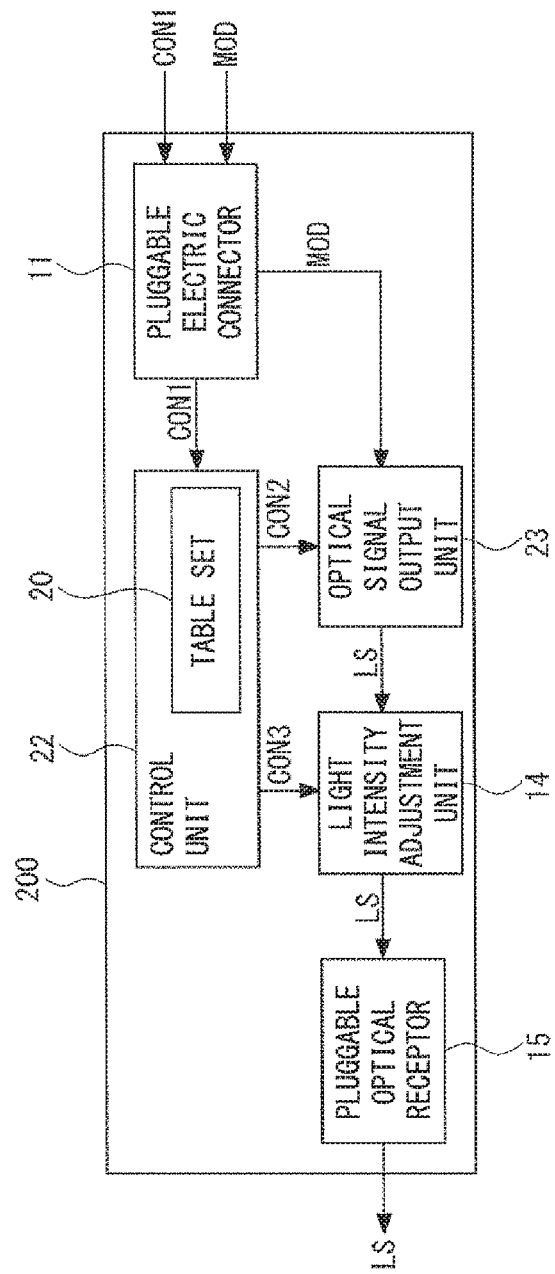
FIG. 10 is a block diagram schematically illustrating a configuration of a pluggable optical module according to a second exemplary embodiment.

A pluggable optical module 200 according to a second exemplary embodiment will be described. The pluggable optical module 200 has a configuration enabling more dynamic phase setting while the pluggable optical module 100 according to the first exemplary embodiment corresponds to the change of the bias point. FIG. 10 is a block diagram schematically illustrating a configuration of the pluggable optical module 200 according to the second exemplary embodiment. The pluggable optical module 200 has the configuration in which the control unit 12 and the optical signal output unit 13 of the pluggable optical module 100 according to the first exemplary embodiment are replaced with a control unit 22 and an optical signal output unit 23, respectively. Note that the pluggable optical module 200 may also receive the modulation signal MOD corresponding to the data signal with the control signal CON1 from the optical communication apparatus 92. In this case, the pluggable optical module 200 may output the optical modulation signal LS modulated based on the received modulation signal MOD. As other configuration of the pluggable optical module 200 is the same as that of the pluggable optical module 100, a description thereof will be omitted.

Figure 11:
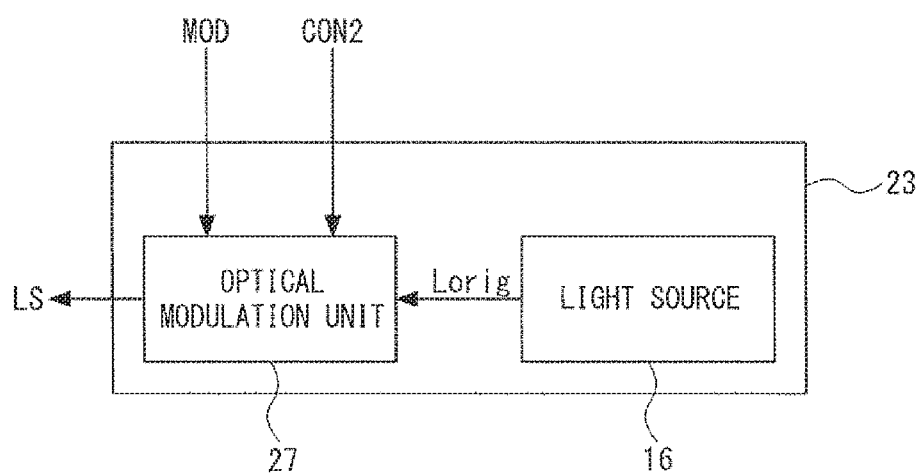
FIG. 11 is a block diagram schematically illustrating a configuration example of an optical signal output unit according to the second exemplary embodiment.

A configuration example of the optical signal output unit 23 will be described. FIG. 11 is a block diagram schematically illustrating the configuration example of the optical signal output unit 23 according to the second exemplary embodiment. The optical signal output unit 23 has a configuration in which the optical modulation unit 17 of the optical signal output unit 13 is replaced with an optical modulation unit 27.

Figure 12:
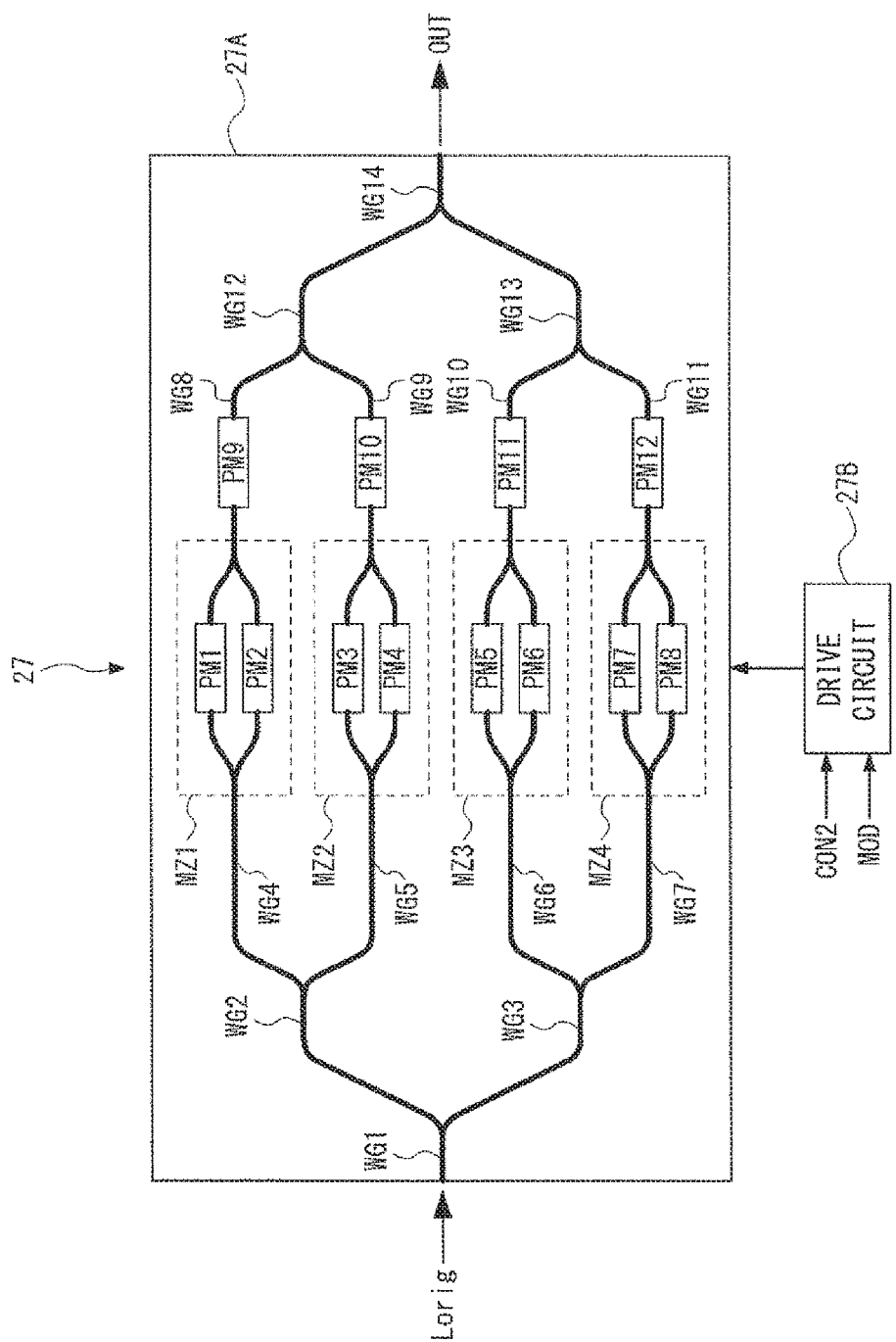
FIG. 12 is a diagram schematically illustrating a configuration of an optical modulation unit according to the second exemplary embodiment.

A configuration of the optical modulation unit 27 will be described. FIG. 12 is a diagram schematically illustrating the configuration of the optical modulation unit 27 according to the second exemplary embodiment. The optical modulation unit 27 includes an optical modulator 27A and a driver circuit 27B. The optical modulator 27A has a configuration in which a plurality of general Mach-Zehnder type optical modulators are combined. In this example, the optical modulator 27A has the configuration in which four Mach-Zehnder type optical modulators MZ1 to MZ4 are combined. The Mach-Zehnder type optical modulators MZ1 to MZ4 each have the same configuration as the optical modulation unit 17 described in the first exemplary embodiment and are arranged in parallel.

The output light Lorig from the light source 16 is input to an optical waveguide WG1. The optical waveguide WG1 is branched into an optical waveguide WG2 and an optical waveguide WG3. The optical waveguide WG2 is branched into an optical waveguide WG4 and an optical waveguide WG5. The optical waveguide WG4 is connected to the input of the Mach-Zehnder type optical modulator MZ1. The optical waveguide WG5 is connected to the input of the Mach-Zehnder type optical modulator MZ2. The optical waveguide WG3 is branched into an optical waveguide WG6 and an optical waveguide WG7. The optical waveguide WG6 is connected to the input of the Mach-Zehnder type optical modulator MZ3. The optical waveguide WG7 is connected to the input of the Mach-Zehnder type optical modulator MZ4.

The output of the Mach-Zehnder type optical modulator MZ1 is connected to an optical waveguide WG8. The output of the Mach-Zehnder type optical modulator MZ2 is connected to an optical waveguide WG9. The output of the Mach-Zehnder type optical modulator MZ3 is connected to an optical waveguide WG10. The output of the Mach-Zehnder type optical modulator MZ4 is connected to an optical waveguide WG11. The optical waveguide WG8 and the optical waveguide WG9 merge to be connected to an optical waveguide WG12. The optical waveguide WG10 and the optical waveguide WG11 merge to be connected to an optical waveguide WG13. The optical waveguide WG12 and the optical waveguide WG13 merge to be connected to an optical waveguide WG14. The optical modulation signal LS that is modulated is output from the optical waveguide WG14.

Note that, in this exemplary embodiment, the phase modulation areas PMA and PMB provided on two optical waveguides of the Mach-Zehnder type optical modulator MZ1 are referred to as phase modulation areas PM1 and PM2. The phase modulation areas PMA and PMB provided on two optical waveguides of the Mach-Zehnder type optical modulator MZ2 are referred to as phase modulation areas PM3 and PM4. The phase modulation areas PMA and PMB provided on two optical waveguides of the Mach-Zehnder type optical modulator MZ3 are referred to as phase modulation areas PM5 and PM6. The phase modulation areas PMA and PMB provided on two optical waveguides of the Mach-Zehnder type optical modulator MZ4 are referred to as phase modulation areas PM7 and PM8. Further, phase modulation areas PM9 to PM12 are provided on the optical waveguides WG8 to WG11, respectively.

The driver circuit 27B can control a modulation operation of the optical modulator 27A and also control a bias point of the optical modulator 27A by applying the bias voltages to the phase modulation areas PM1 to PM12, respectively. The driver circuit 27B can also modulate the optical modulation signal LS by applying the modulation signals to the phase modulation areas PM1 to PM12, respectively.

Figure 13:
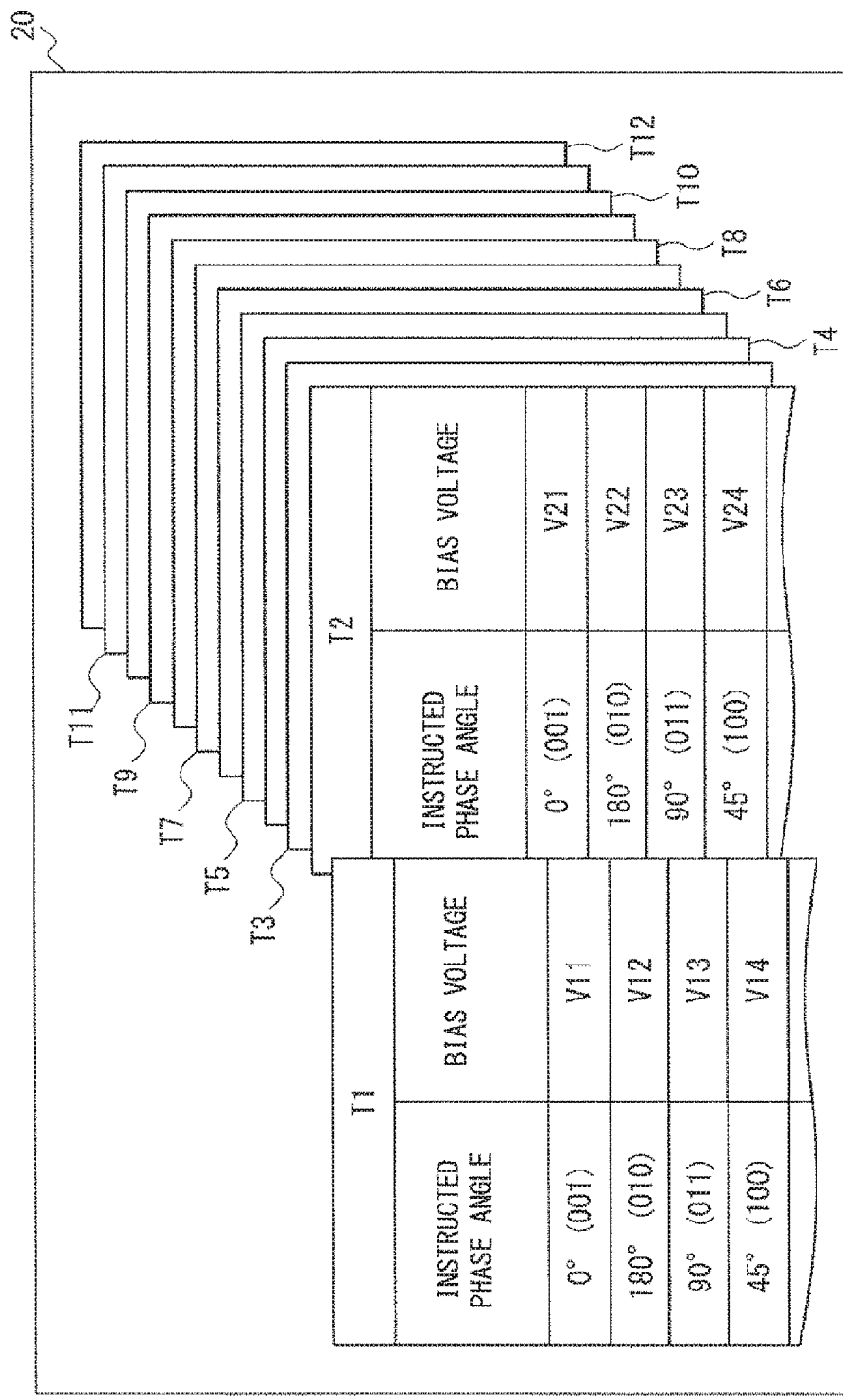
FIG. 13 is a diagram illustrating a table set of a control unit according to the second exemplary embodiment.

The control unit 22 determines the bias voltages applied to the phase modulation areas PM1 to PM12 of the optical modulation unit 27 by referring to a table set 20. The table set 20 includes a plurality of tables and, in the present exemplary embodiment, includes tables T1 to T12 corresponding to the phase modulation areas PM1 to PM12, respectively. FIG. 13 is a diagram illustrating the table set 20 of the control unit 22 according to the second exemplary embodiment. The table set 20 includes the tables T1 to T12 indicating values of the bias voltages to be applied to each phase area for achieving the instructed phase angle.

Figure 14:
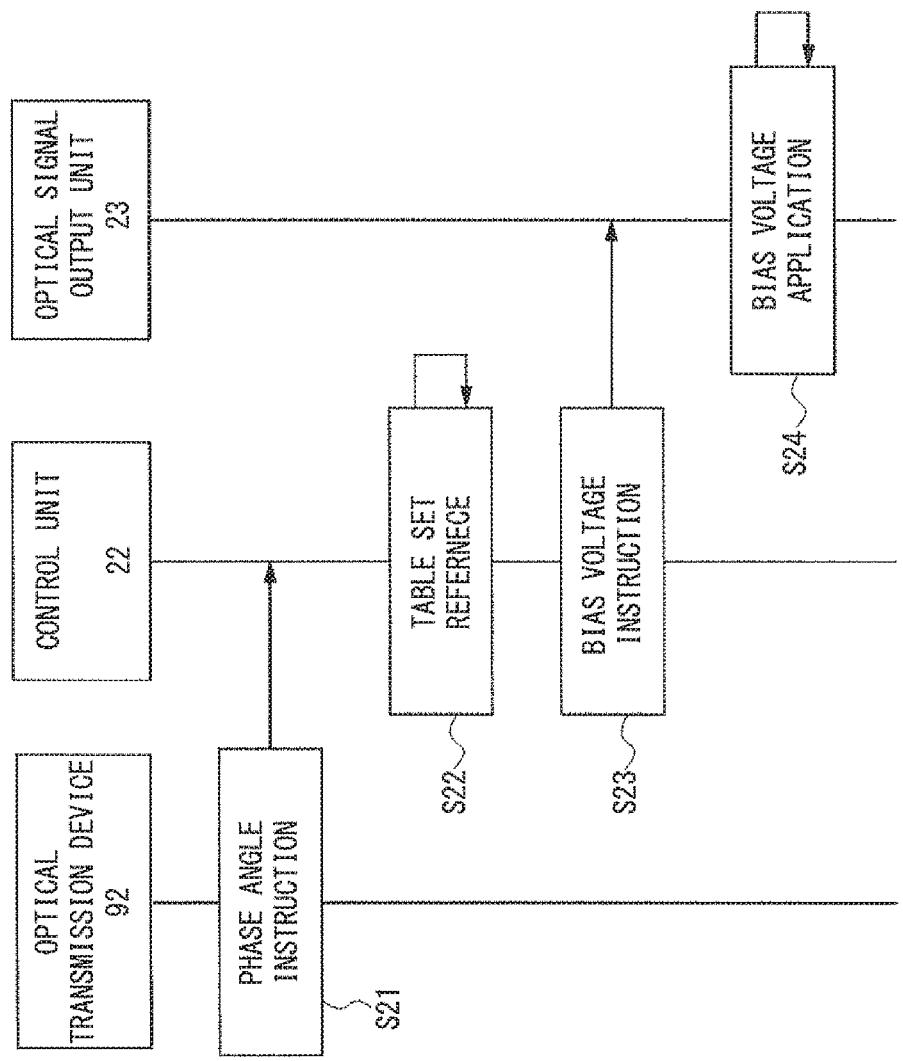
FIG. 14 is a sequence diagram illustrating a bias point change operation of the pluggable optical module according to the second exemplary embodiment.

Subsequently, a bias point change operation of the pluggable optical module 200 will be described. FIG. 14 is a sequence diagram illustrating the bias point change operation of the pluggable optical module 200 according to the second exemplary embodiment.

Step S21: Phase Angle Information Reception

The control unit 22 receives the control signal CON1 including phase angle information corresponding to the phase modulation areas PM1 to PM12 for changing the bias point from the optical communication apparatus 92.

Step S22: Bias Voltage Determination

The control unit 22 refers to the tables T1 to T12 based on the phase angle information corresponding to the phase modulation areas PM1 to PM12 to determine the bias voltages applied to the phase modulation areas PM1 to PM12.

Step S23: Bias Voltage Command

The control unit 22 instructs values of the determined bias voltages applied to the phase modulation areas PM1 to PM12 to the optical signal output unit 13 by the control signal CON2.

Step S24: Bias Voltage Application

The optical signal output unit 23 applies the determined bias voltages to the phase modulation areas PM1 to PM12, respectively.

As described above, according to the present configuration, in the pluggable optical module 200 including the optical modulator in which a plurality of the Mach-Zehnder optical modulators are combined, the bias voltages suitable for achieving the instructed phase angle can be autonomously applied to each phase modulation area of each Mach-Zehnder optical modulator. Additionally, each phase modulation area can be controlled so that flexible phase setting can be dynamically achieved.

Third Exemplary Embodiment

A pluggable optical module 300 according to a third exemplary embodiment will be described. The pluggable optical module 300 is a modified example of the pluggable optical module 200 according to the second exemplary embodiment, and is configured to change the wavelength of the light output from the light source. There may be a case where the optical communication apparatus requests the pluggable optical module to change the wavelength. When complying with the request for the wavelength change, the pluggable optical module is required to autonomously perform and complete the change operation.

Figure 15:
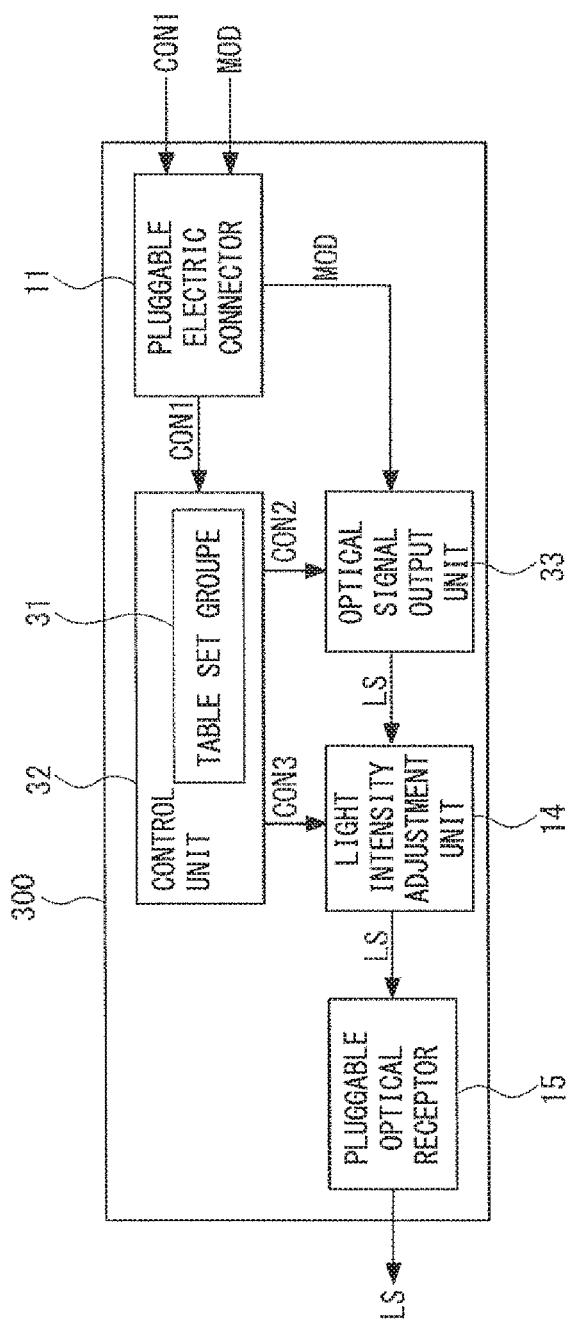
FIG. 15 is a block diagram schematically illustrating a configuration of a pluggable optical module according to a third exemplary embodiment.

FIG. 15 is a block diagram schematically illustrating a configuration of the pluggable optical module 300 according to the third exemplary embodiment. The pluggable optical module 300 has the configuration in which the control unit 12 and the optical signal output unit 13 of the pluggable optical module 200 according to the second exemplary embodiment are replaced with a control unit 32 and an optical signal output unit 33, respectively.

The optical signal output unit 33 is configured to be capable of changing the wavelength of the optical modulation signal LS. Thus, the optical signal output unit 33 outputs the optical modulation signal LS of a single wavelength within a tunable wavelength range according to the control signal CON2 output from the control unit 32. The optical signal output unit 33 may modulates the optical modulation signal LS by various types of modulation methods such as phase modulation, amplitude modulation and polarization modulation or by combining the various types of modulation methods as in the case of the optical signal output unit 23.

Figure 16:
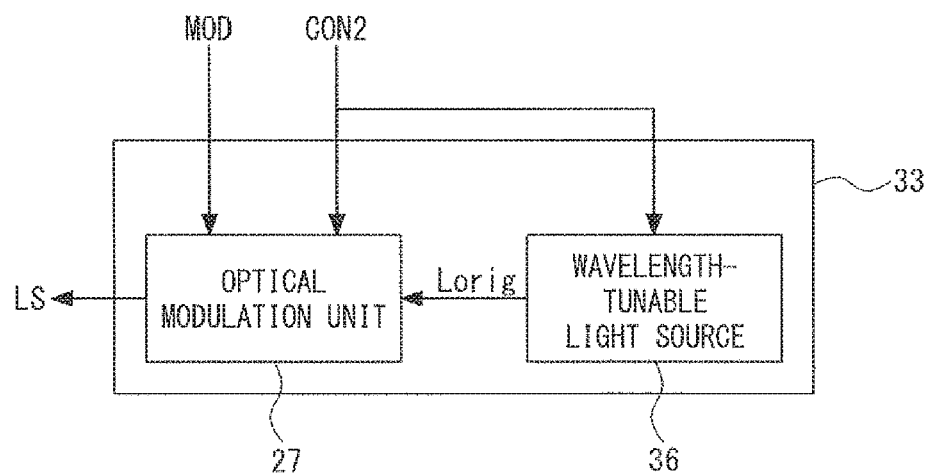
FIG. 16 is a block diagram illustrating a configuration example of an optical signal output unit according to the third exemplary embodiment.

A configuration example of the optical signal output unit 33 will be described. FIG. 16 is a block diagram illustrating the configuration example of the optical signal output unit 33 according to the third exemplary embodiment. The optical signal output unit 13 includes a wavelength-tunable light source 36 and the optical modulation unit 27. As the optical modulation unit 27 is the same as that in the second exemplary embodiment, a description thereof will be omitted.

The wavelength-tunable light source 36 includes a semiconductor laser and wavelength tuning means such as a ring oscillator, for example, and outputs the output light Lorig. The wavelength of the output light Lorig is controlled by the control signal CON2 from the control unit 32.

Similarly to the control unit 22 according to the second exemplary embodiment, the control unit 32 controls the modulation operation and the operating point of the optical modulation unit 27 of the optical signal output unit 33. Further, the control unit 32 can control the wavelength of the output light Lorig of the wavelength-tunable light source 36 by the control signal CON2.

As described above, the pluggable optical module 300 is configured to be capable of changing the wavelength of the optical modulation signal LS. However, when the wavelength of the optical signal is different, the bias voltage applied to the phase modulation area for achieving the instructed phase angle also varies. Thus, for each changeable wavelength, a table set storing information of the bias voltage applied to each phase modulation area is required.

Figure 17:
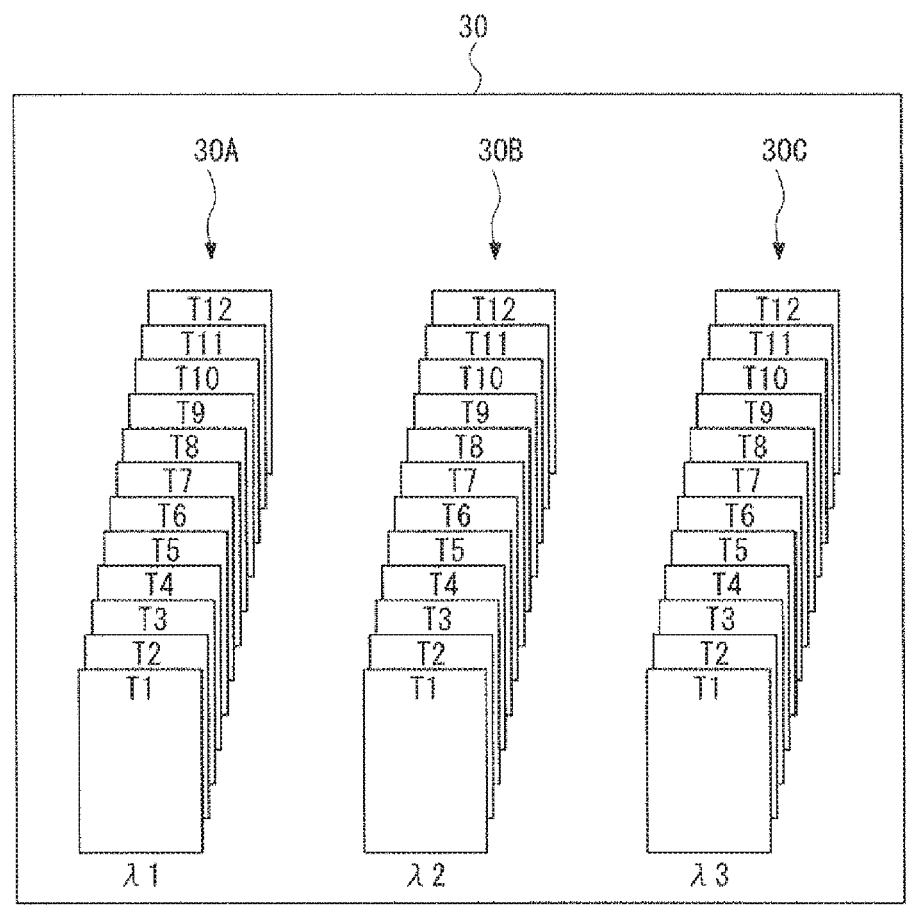
FIG. 17 is a diagram illustrating a table set group of a control unit according to the third exemplary embodiment.

FIG. 17 is a diagram illustrating a table set group 30 of the control unit 32 according to the third exemplary embodiment. It is a block diagram illustrating a configuration of the control unit 32 according to the third exemplary embodiment. The control unit 32 refers to any of table sets 30A to 30C provided for each changeable wavelength included in the table set group 30 to determine the bias voltages applied to the phase modulation areas PM1 to PM12 of the optical modulation unit 27. The table sets 30A to 30C include a plurality of tables similarly to the table set 20 according to the second exemplary embodiment. In this embodiment, the table sets 30A to 30C include tables T1 to T12 corresponding to the phase modulation areas PM1 to PM12, respectively.

Figure 18:
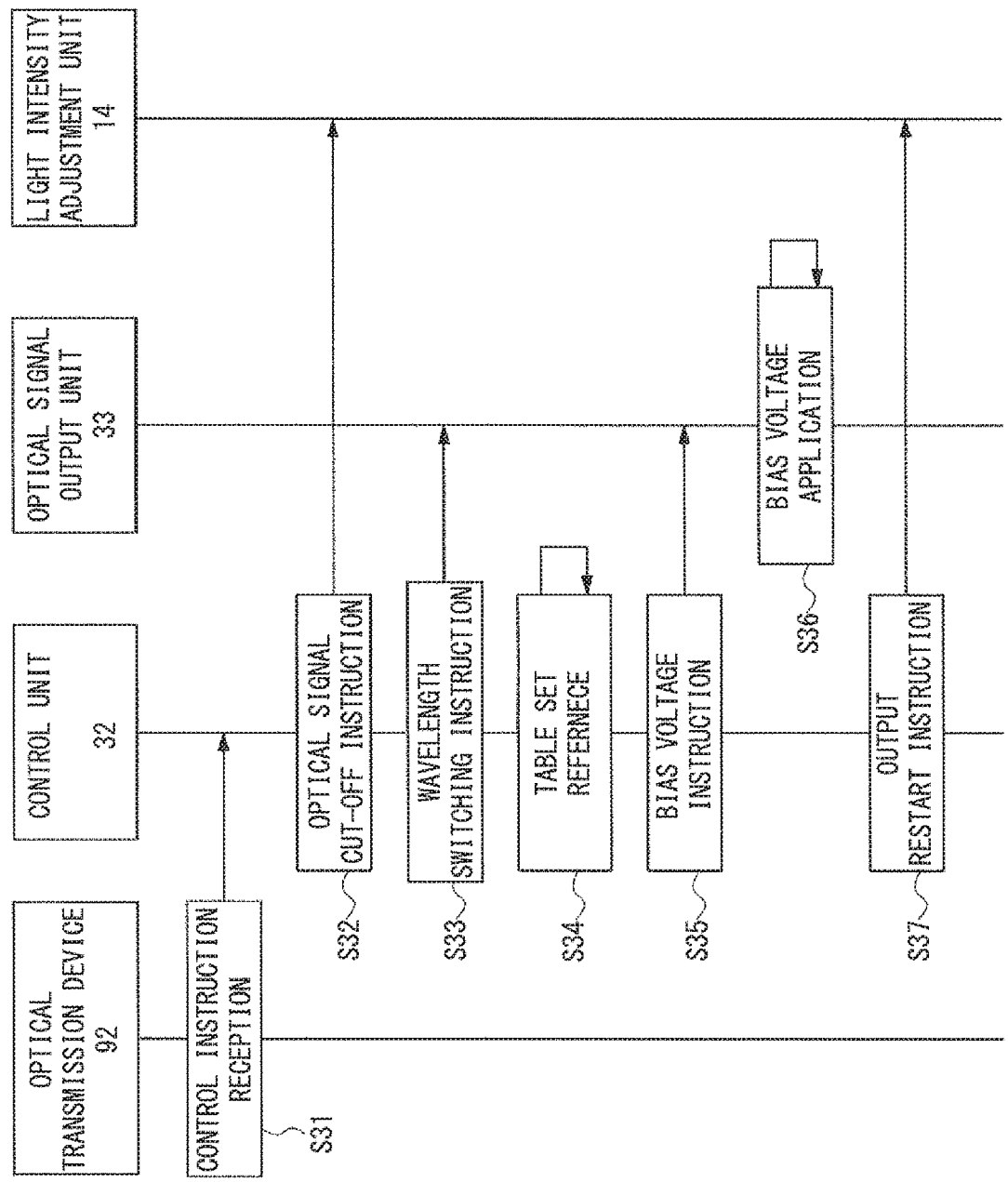
FIG. 18 is a sequence diagram illustrating a wavelength change operation of the pluggable optical module according to the third exemplary embodiment.

Subsequently, a wavelength change operation of the pluggable optical module 300 will be described. FIG. 18 is a sequence diagram illustrating the wavelength change operation of the pluggable optical module 300 according to the third exemplary embodiment.

Step S31: Control Information Reception

In a state where the pluggable optical module 300 outputs the optical modulation signal LS of the wavelength λ1 to the optical fiber 91, the control unit 32 receives the control signal CON1 including control information from the optical communication apparatus 92. This control information includes a wavelength change command of the optical signal and phase angle information corresponding to the phase modulation areas PM1 to PM12 for the bias point change from the optical communication apparatus 92.

Step S32: Optical Signal Block Operation

The control unit 32 performs a block operation of the optical signal based on the wavelength change command. Specifically, the control unit 32 instructs the optical power control unit 14 to block the optical modulation signal LS using the control signal CON3. The optical power control unit 14 blocks the optical modulation signal LS according to the control signal CON3. The control unit 32 may also perform the block operation of the optical signal LS by instructing the optical signal output unit 33 to stop outputting the optical modulation signal LS using the control signal CON2. Note that the control unit 32 may also instruct the optical power control unit 14 to block the optical modulation signal LS and instruct the optical signal output unit 33 to stop outputting the optical modulation signal LS in parallel when performing the block operation of the optical signal.

Step S33: Wavelength Change Command

The control unit 32 instructs the optical signal output unit 33 to change the wavelength of the optical modulation signal LS from λ1 to λ2 (λ1≠λ2) based on the wavelength change command. Thus, the optical signal output unit 33 changes the wavelength of the optical modulation signal LS from λ1 to λ2. In this case, the optical signal output unit 33 may perform the operation for changing the wavelength from λ1 to λ2 after stopping the output of the optical modulation signal LS.

Step S34: Table Set Reference

The control unit 32 refers to the table set 30B corresponding to the phase modulation areas PM1 to PM12 at the wavelength λ2 after the wavelength change based on the phase angle information to determine the bias voltages applied to the phase modulation areas PM1 to PM12.

Step S35: Bias Voltage Command

The control unit 32 instructs the values of the determined bias voltages applied to the phase modulation areas PM1 to PM12 to the optical signal output unit 33 by the control signal CON2.

Step S36: Bias Voltage Application

The optical signal output unit 33 applies the determined bias voltage to the phase modulation areas PM1 to PM12, respectively.

Step S37: Output Restart Command

After the wavelength change is finished, the control unit 32 performs an operation for restarting the output of the optical modulation signal LS. Specifically, the control unit 32 controls the optical power control unit 14 to control the optical modulation signal LS to predetermined optical power. Thus, the optical modulation signal LS of the wavelength λ2 is output to the optical fiber 91.

The control unit 32 may control the optical signal output unit 13 to output the optical modulation signal LS of the wavelength λ2 after the wavelength change before the control of the optical power control unit 14 in the Step S14 when the output of the optical signal of the optical signal output unit 33 has been stopped in the Step S32 or S33.

As described above, the present configuration robustly blocks the output of the optical signal when the pluggable optical module changes the wavelength of the optical signal according to the command of the optical communication apparatus 92. Therefore, transmission of an instable optical signal during the wavelength change can be prevented. Then, the optical signal is transmitted after the wavelength change so that the optical signal having the desired wavelength and stability can be transmitted from the pluggable optical module.

Thus, the appropriate bias voltage corresponding to the wavelength after the change can be applied. In other words, in each of the changeable plurality, the appropriate bias voltages for achieving the instructed phase angle can be applied to the phase modulation areas provided in the modulation unit.

Other Exemplary Embodiments

The present invention is not limited to the above-described exemplary embodiments, and can be modified as appropriate without departing from the scope of the invention. For example, in the exemplary embodiments described above, the optical communication apparatus 92 also may perform a status request on the pluggable optical module. In this case, the control unit of the pluggable optical module receives the status request from the optical communication apparatus 92 via the pluggable electric connector 11. The control unit of the pluggable optical module notifies the optical communication apparatus 92 via the pluggable electric connector 11 of the operation state of the pluggable optical module when receiving the status request. Specifically, the control unit of the pluggable optical module notifies the optical communication apparatus 92 whether or not the bias point operation or the wavelength change operation is running. The control unit of the pluggable optical module may also notify the optical communication apparatus 92 which processing stage of each step illustrated in FIG. 10, FIG. 14 and FIG. 18 is running during the wavelength change operation. Further, it is possible to notify the optical communication apparatus 92 of operation stability information of the wavelength-tunable light source and the optical modulation unit included in the optical signal output unit 13.

For example, in the third exemplary embodiment, it can be assumed that the optical communication apparatus 92 instructs the pluggable optical module to stop the output of the optical signal while the pluggable optical module is performing the wavelength change operation. In this case, the control unit of the pluggable optical module receives the command to stop the output of the optical signal from the optical communication apparatus 92 via the pluggable electric connector 11. However, since the pluggable optical module is under the wavelength change operation, the optical module may reject the command to stop the output of the optical signal. Therefore, occurrence of malfunction due to the overlapped operation requests can be prevented. Further, when receiving the command to stop the optical signal output from the optical communication apparatus 92 via the pluggable electric connector 11, the optical signal output may be stopped after the wavelength change is completed. Therefore, the overlapped operation requests can be processed in order and the desired operation required by the optical communication apparatus 92 can be robustly performed. Note that it goes without saying that the optical communication apparatus 92 can appropriately instruct the pluggable optical module to start the output of the optical signal and to stop the output of the optical signal.

In the exemplary embodiments described above, it is described that the control unit of the pluggable optical module controls the wavelength-tunable light source, the optical modulation unit and the optical power control unit according to the control signal CON1 from the optical communication apparatus 92. However, it is merely an example. The control unit of the pluggable optical module can autonomously control the wavelength-tunable light source, the optical modulation unit and the optical power control unit regardless of the control signal from outside.

In the exemplary embodiments described above, the communication of the control signal via the pluggable electric connector 11 can be achieved applying the technologies such as a MDIO (Management Data Input/Output) or an I2C (Inter-Integrated Circuit).

In the exemplary embodiments described above, the power of the optical signal output from the optical signal output unit may be monitored and, for example, the optical output power of the wavelength-tunable light source provided in the optical signal output unit may be feedback-controlled. In this case, a part of the optical signal output from the optical signal output unit is branched by such as an optical demultiplexer and the branched optical signal is monitored by a light receiving device such as a photodiode. Then, the control unit can feedback-control the power of the optical signal output from optical signal output unit by notifying the control unit of the monitoring result.

In the exemplary embodiments described above, the power of the optical signal output from the optical power control unit is monitored and, for example, the optical power of the optical power control unit and the optical output power of the wavelength-tunable light source provided in the optical signal output unit may be feedback-controlled. In this case, a part of the optical signal output from the optical power control unit is branched by such as the optical demultiplexer and the branched optical signal is monitored by the light receiving device such as the photodiode. Then, the control unit can feedback-control one or both of the power of the optical signal output from optical signal output unit and the optical power controlled by the optical power control unit by notifying the control unit of the monitoring result.

In the exemplary embodiments described above, although it is described that the configuration of the transmission side of the pluggable optical module, it goes without saying that the pluggable optical module may include a reception unit receiving the optical signal from the outside and demodulating the received optical signal.

The pluggable optical module described above may set a phase difference at the output of the optical modulator at the time of no modulation to zero (phase difference minimum) or 180 degrees (phase difference maximum) by controlling the bias point. Further, the pluggable optical module may set the phase difference at the output of the optical modulator at the time of no modulation to any phase difference such as 30 degrees, 45 degrees and 60 degrees by controlling the bias point.

The present invention has been described above with reference to the exemplary embodiments, but the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2015-57345, filed on Mar. 20, 2015, the disclosure of which is incorporated herein in its entirety by reference.

REFERENCE SIGNS LIST

11 PLUGGABLE ELECTRIC CONNECTOR
12, 22, 32 CONTROL UNITS
12A MEMORY UNIT
12B COMMAND UNIT
13, 23, 33 OPTICAL SIGNAL OUTPUT UNITS
14 OPTICAL POWER CONTROL UNIT
15 PLUGGABLE OPTICAL RECEPTOR
16 LIGHT SOURCE
17, 27 OPTICAL MODULATION UNITS
17A, 27A OPTICAL MODULATOR
17B, 27B DRIVER CIRCUITS
20, 30A TO 30C TABLE SETS

30 TABLE SET GROUP
36 WAVELENGTH-TUNABLE LIGHT SOURCE
91 OPTICAL FIBER
92 OPTICAL COMMUNICATION APPARATUS
100, 200, 300 PLUGGABLE OPTICAL MODULES
171 TO 174 OPTICAL WAVEGUIDES
1000 OPTICAL COMMUNICATION SYSTEM
CON1 TO CON3 CONTROL SIGNALS
Lorig OUTPUT LIGHT
LS OPTICAL MODULATION SIGNAL
MOD MODULATION SIGNAL
MZ1 TO MZ4 MACH-ZEHNDER TYPE OPTICAL MODULATORS
PM1 OT PM12, PMA, PMB PHASE MODULATION AREAS
T1 TO T12 TABLES
TAB TABLE
WG1 TO WG14 OPTICAL WAVEGUIDES

The invention claimed is:
1. A pluggable optical module comprising:
an electrical connector configured to connect with a host communication apparatus, the host communication apparatus outputting a data signal and a control signal via the electrical connector;
an optical connector configured to connect with an optical fiber;
an optical light source configured to output a light;
a Mach-Zehnder modulator, including a first optical waveguide and a second optical waveguide, configured to output an optical signal generated by interference between a first light passing through the first optical waveguide and a second light passing through the second optical waveguide; and
a driver configured to drive the modulator based on the data signal, and apply a bias voltage to the modulator, the bias voltage corresponding to a phase difference between the first light and the second light based on an angle indicated by the control signal.
2. The pluggable optical module according to claim 1, further comprising a controller configured to:
receive the control signal;
identify the bias voltage based on the received control signal; and
set the identified bias voltage to the driver.
3. The pluggable optical module according to claim 2, wherein the controller is further configured to control the bias voltage to set a phase difference of the modulator to a minimum point or a maximum point.
4. The pluggable optical module according to claim 1, wherein
the modulator comprises a first Mach-Zehnder interferometer and a second Mach-Zehnder interferometer,
the control signal indicates a first phase angle and a second phase angle,
the driver applies a first Mach-Zehnder bias voltage to the first Mach-Zehnder interferometer,
the driver applies a second Mach-Zehnder bias voltage to the second Mach-Zehnder interferometer,
the first Mach-Zehnder bias voltage corresponds to the first phase angle, and
the second Mach-Zehnder bias voltage corresponds to the second phase angle.
5. The pluggable optical module according to claim 4, wherein
the first Mach-Zehnder interferometer is an inner Mach-Zehnder interferometer, and
the second Mach-Zehnder interferometer is an outer Mach-Zehnder interferometer.
6. The pluggable optical module according to claim 1, wherein
the optical light source is further configured to change a wavelength of the light in response to a wavelength change command received from the host communication apparatus, and
the driver is further configured to apply the bias voltage corresponding to the changed wavelength.
7. The pluggable optical module according to claim 1, wherein the control signal comprises binary bits representing the phase angle.
8. The pluggable optical module according to claim 1, further comprising an optical attenuator configured to control power of the optical signal and output the power controlled optical signal to the optical fiber via the optical connecter.
9. A communication system comprising:
a pluggable optical module;
a host communication apparatus outputting a data signal and a control signal to the pluggable optical module; and
an optical fiber, wherein
the optical module comprising:
an electrical connector configured to connect with the host communication apparatus;
an optical connector configured to connect with the optical fiber;
an optical light source configured to output a light;
a Mach-Zehnder modulator, including a first optical waveguide and a second optical waveguide, configured to output an optical signal generated by interference between a first light passing through the first optical waveguide and a second light passing through the second optical waveguide; and
a driver configured to drive the modulator based on the data signal and apply a bias voltage to the modulator,
the bias voltage corresponding to a phase difference between the first light and the second light based on an angle indicated by the control signal.
10. The communication system according to claim 9, wherein
the pluggable optical module further comprises a controller configured to:
receive the control signal;
identify the bias voltage based on the received control signal; and
set the identified bias voltage to the driver.
11. The communication system according to claim 10, wherein the controller is further configured to control the bias voltage to set a phase difference of the modulator to a minimum point or a maximum point.
12. The communication system according to claim 9, wherein
the modulator comprises a first Mach-Zehnder interferometer and a second Mach-Zehnder interferometer,
the control signal indicates a first phase angle and a second phase angle,
the driver applies a first Mach-Zehnder bias voltage to the first Mach-Zehnder interferometer,
the driver applies a second Mach-Zehnder bias voltage to the second Mach-Zehnder interferometer,
the first Mach-Zehnder bias voltage corresponds to the first phase angle, and
the second Mach-Zehnder bias voltage corresponds to the second phase angle.

13. The communication system according to claim 12, wherein
the first Mach-Zehnder interferometer is an inner Mach-Zehnder interferometer, and
the second Mach-Zehnder interferometer is an outer Mach-Zehnder interferometer.

14. The communication system according to claim 9, wherein
the optical light source is further configured to change a wavelength of the light in response to a wavelength change command received from the host communication apparatus, and
the driver is further configured to apply the bias voltage corresponding to the changed wavelength.

15. The communication system according to claim 9, wherein the control signal comprises binary bits representing the phase angle.

16. The communication system according to claim 9, wherein the pluggable optical module further comprises an optical attenuator configured to control power of the optical signal and output the power controlled optical signal to the optical fiber via the optical connecter.

17. A communication method of a pluggable optical module comprising:
receiving a data signal and a control signal,
outputting a light;
outputting an optical signal generated by interference between a first light passing through a first optical waveguide of a Mach-Zehnder modulator and a second light passing through a second optical waveguide of the Mach-Zehnder modulator;
driving a modulator based on the data signal; and
applying a bias voltage to the modulator, the bias voltage corresponding to a phase difference between the first light and the second light based on an angle indicated by the control signal.

18. The communication method according to claim 17, further comprising:
receiving the control signal;
identifying the bias voltage based on the received control signal; and
setting the identified bias voltage to a driver.

19. The communication method according to claim 18, further comprising controlling the bias voltage to set a phase difference of the modulator to a minimum point or a maximum point.

20. The communication method according to claim 17, further comprising:
applying a first Mach-Zehnder bias voltage to a first Mach-Zehnder interferometer included in the modulator, and
applying a second Mach-Zehnder bias voltage to a second Mach-Zehnder interferometer included in the modulator, wherein
the first Mach-Zehnder bias voltage corresponds to a first phase angle indicated by the control signal, and
the second Mach-Zehnder bias voltage corresponds to a second phase angle indicated by the control signal.

21. The communication method according to claim 20, wherein
the first Mach-Zehnder interferometer is an inner Mach-Zehnder interferometer, and
the second Mach-Zehnder interferometer is an outer Mach-Zehnder interferometer.

22. The communication method according to claim 17, further comprising:
changing a wavelength of the light in response to a wavelength change command received from the host communication apparatus; and
applying the bias voltage corresponding to the changed wavelength.

23. The communication method according to claim 17, wherein the control signal comprises binary bits representing the phase angle.

24. The communication method according to claim 17, further comprising controlling power of the optical signal and outputting the power controlled optical signal.

* * * * *